United States Patent Office 3,437,582
Patented Apr. 8, 1969

3,437,582
APPARATUS FOR PRODUCTION OF O₃F₂
Russell A. Hemstreet, Mountainside, and Alfred H. Taylor, Millington, N.J., assignors to Air Reduction Company, Incorporated, New York, N.Y., a corporation of New York
Filed Jan. 21, 1965, Ser. No. 426,772
Int. Cl. B01k 1/00
U.S. Cl. 204—312                                    23 Claims This invention relates to the production of trioxygen difluoride.

Trioxygen difluoride, $O_3F_2$ (sometimes known as ozone fluoride), is a blood-red liquid which is formed by passing a high voltage electrical discharge through a stoichiometric mixture of oxygen and fluorine in an evacuated glass reactor, mounted in a refrigerant bath comprising liquid oxygen or nitrogen. Trioxygen difluoride decomposes rapidly and spontaneously at a temperature of 120° K. or higher, forming dioxygen difluoride, $O_2F_2$, which subsequently decomposes into oxygen and fluorine at about 200° K. Although pure trioxygen difluoride can be evaporated rapidly, refluxed or thermally decomposed without explosion, it reacts explosively upon coming in contact with most oxidizable matter.

The properties of this liquid are of substantial interest in connection with rocket propulsion, since trioxygen difluoride is soluble in oxygen to the extent of 0.11 percent by weight at the boiling point of the latter (90° K.); and, it has been found that between 0.05 and 0.11 percent by weight of trioxygen difluoride is sufficient to render liquid oxygen hypergolic with other fuels, that is, capable of igniting spontaneously upon contact.

Tests have indicated that the advantages of using a rocket propellant-oxident which comprises an 0.05 percent or higher solution of trioxygen difluoride in liquid oxygen, as compared with pure liquid oxygen, are that ignition is prompt, stability of combustion is improved, the system is simple and more reliable, and weight saving results by elimination of on-board ignition devices or primer fuels.

However, one of the principal disadvantages in employing a solution of trioxygen difluoride in liquid oxygen for rocket propulsion purposes is that prior art methods have been inadequate to produce the necessary quantities of trioxygen difluoride.

Furthermore, trioxygen difluoride decomposes at a high rate at temperatures above 120° K. to form a yellow solid, dioxygen difluoride, which ultimately breaks up into fluorine and oxygen. Moreover, trioxygen difluoride reacts with numerous materials, including water, to produce highly toxic products, including fluorine and hydrogen fluoride, thus making this material not only difficult to produce, but to handle and move from one site to another.

Accordingly, a principal object of the present invention is to increase the efficiency and reduce the hazard in the production of trioxygen difluoride. A more particular object of the invention is to accelerate production of trioxygen difluoride by, to some extent, arresting the concurrent decomposition. A further object of the invention is to purge the final product of dioxygen difluoride. Another object of the invention is to produce relatively more trioxygen difluoride product per unit time, using the same quantity of stoichiometric gaseous charge. Still another object of the invention is to provide for increased safety during production and handling of trioxygen difluoride.

The foregoing objects are realized in accordance with the present invention in each of several embodiments of high vacuum glow-discharge devices. Each device comprises one or more elongated glass reaction bulbs, each including a pair of electrodes connected to a source of power for sustaining the glow-discharge. Each bulb is tapped into a source of a stoichiometric mixture of the feed gases, oxygen and fluorine, and has an outlet feeding into a manifold of the trioxygen difluoride product. In a preferred form of the invention, the manifold in which the product is collected is formed of a material of high thermal conductivity, a cryogenic bath serving to refrigerate the manifold and other parts of the apparatus including the reaction bulbs. The product is collected and stored in a bath of liquid oxygen solvent.

A particular feature of the invention is a downwardly protruding lip, molded into the vertical side-wall on the lower portion of the reaction bulb, which forms an annular channel adjacent the connection to the downwardly inclined manifold tube. This lip has a double function, one of which is to remove the newly formed trioxygen difluoride, which runs down the inside of the reaction bulb, from the heat of the reaction zone, thereby preventing immediate decomposition; and, another of which is to collect and separate out any solid particles of dioxygen difluoride, or other impurities, which may result from the reaction, from the liquid ultimately collected in the receiving reservoir.

Another feature of the invention, designed to remove the heat of the glow-discharge and thereby arrest decomposition of the product, is extension of the ends of the electrodes in contact with or adjacent to the cryogenic bath.

Still another feature of the invention is the use of glass-to-metal seals and specifically designed metal joints between the reaction bulb components to minimize breakage and thereby increase the stability of the apparatus and also to accelerate heat dissipation in the apparatus.

In accordance with one embodiment of the invention, a plurality of reaction bulbs, in addition to receiving the gaseous charge from a single input source, are disposed to multiply the product by an arrangement in which the individual reaction bulbs are joined by means of glass-to-metal seals at different positions along an inclined metal manifold tube which collects and feeds the product into a vessel containing a solvent bath of liquid oxygen. In another embodiment, the same result is accomplished in an arrangement in which a plurality of reaction bulbs are disposed in a circular array, withdrawing gaseous charge from a common source and feeding product into a common receiving reservoir.

It has been found that using the structures of the present invention, a 20 to 30 percent increase in production of trioxygen difluoride has been realized, per individual tube, over that possible with prior art apparatus. Moreover, this increase in production has been greatly multiplied by manifolding the product in accordance with the teachings of the present invention. Moreover, the hazards of producing this liquid have been substantially reduced by use of the structures and arrangements of the present invention, including metal components and glass-to-metal seals of the type disclosed.

These and other objects, features, and advantages of this invention will be apparent to those skilled in the art upon studying the detailed specification hereinafter, together with the attached drawings, in which:

FIGURE 3 is a diagram showing how the schematics of FIGURES 1 and 2 fit together;

Figure 1:
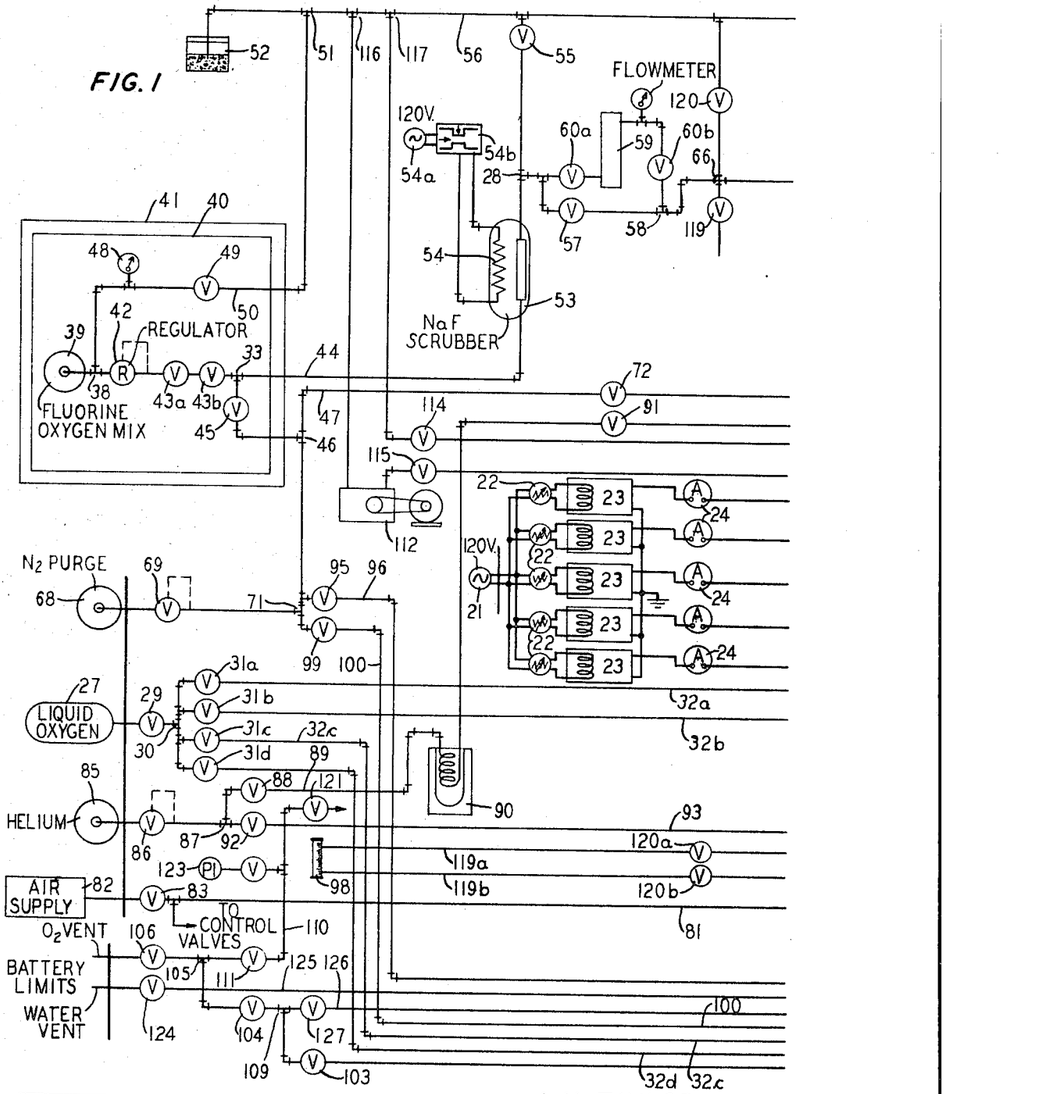
FIGURES 1 and 2 represent over-all schematic showings of a glow-discharge system for the production of trioxygen difluoride modified in accordance with the present invention.
Figure 2:
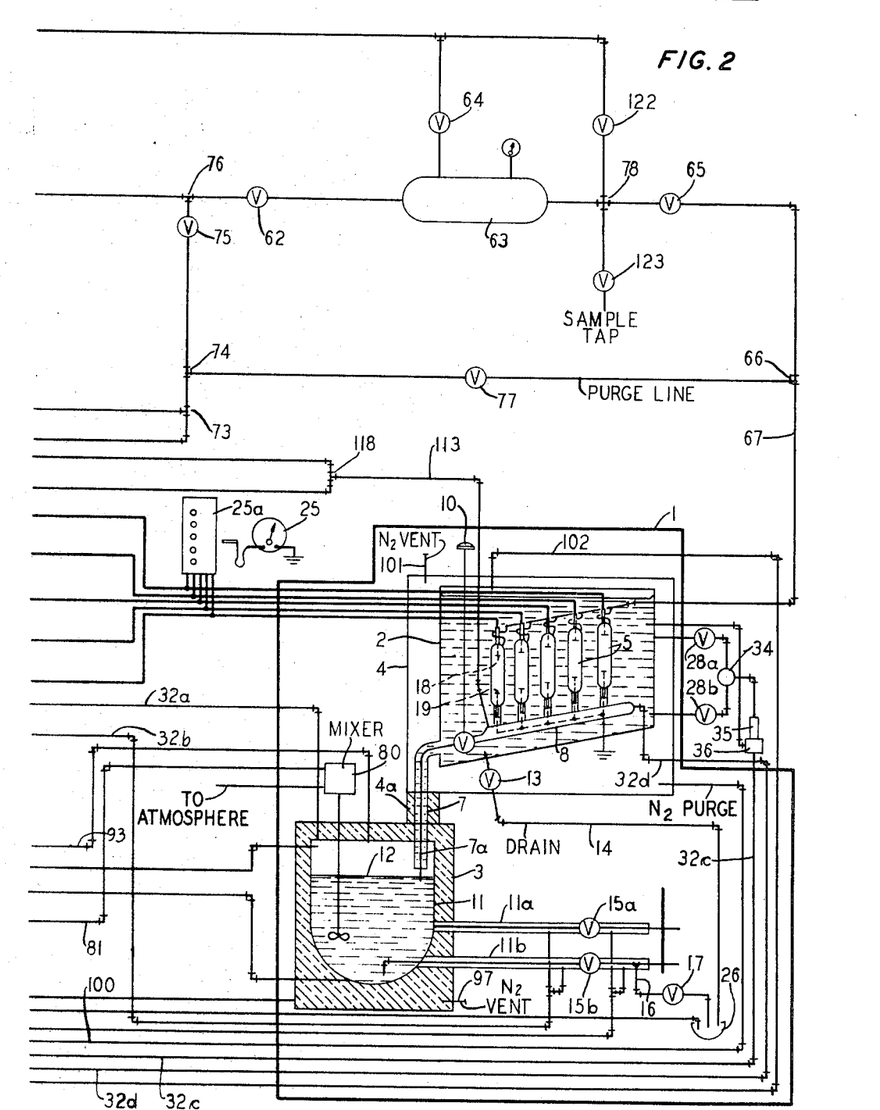

Referring in detail to FIGURES 1 and 2 of the drawings, showing a schematic of the over-all system for the production of trioxygen difluoride ($O_3F_2$), the outer enclosure 1 is a housing comprising a material, such as a steel or concrete, forming a barrier wall within which are mounted the innermost elements, including a plurality of reaction bulbs, feeding into a manifold which, in turn, communicates with a receiving vessel including a solvent bath for the product. The inner enclosure 2, which may be a stainless steel chamber, completely encloses a plurality of glass reaction bulbs 5 which number five, for the purposes of the present illustrative embodiment, but which may comprise any convenient number. These are mounted at spaced positions along an inclined tube 8 of stainless steel, for example, which serves as a manifold for collecting the product manufactured simultaneously in the several reaction bulbs 5 in each of which a glow-discharge is continuously generated between a pair of electrodes. The details of structure of the tubes and the electrodes 18 and 19, including specific features of the present invention, will be explained hereinafter. The enclosure 2, which in the present illustrative embodiment is a trapezoidal vessel, is filled with a cryogenic bath, preferably liquid oxygen, to a level completely covering reaction bulbs 5 and their appendages. The inner vessel 2 is enclosed in a rectangular, outer, insulating vessel 4, also of steel, which is filled with suitable insulation, such as, for example, perlite.

The inclined stainless steel manifold tube 8 is connected through the extended bonnet valve 10 to the inner tube 7a of a coaxial conduit 7, which is encased in an outer tube through which flows oxygen from the liquid oxygen bath in the enclosure 2. The stem of valve 10 passes out through fluid-tight seals in enclosures 2 and 4, and can be manually manipulated. Valve 10 remains closed during production of trioxygen difluoride to permit the liquid to accumulate in manifold 8.

The coaxial conduit 7–7a which is suitably insulated by a cylindrical extension 4a of the insulating housing 4, containing perlite or other suitable material, extends vertically into the receiving tank 11, of general cylindrical form, having a hemispherical bottom, which is initially filled with about 25 gallons of liquid oxygen, forming a bath 12. The tank 11 containing bath 12 is enclosed in a steel outer chamber 3, similar to outer chamber 1, which is insulated with perlite or the like. From time to time, valve 10 is opened to permit the accumulated trioxygen difluoride to trickle through tube 7a into the bath 12 where it dissolves.

During the normal operation of the system, the pressure inside tank 11 is maintained at from zero to five pounds per square inch, gauge. When valve 10 is open, the trioxygen difluoride product from the inclined manifold tube 8 will pass into tank 11, the trioxygen difluoride dissolving in the bath 12 up to its solubility limit, which is about 0.11 percent by weight. As shown, the oxygen of bath 2 fills the annular space around the inner tube 7a. Assuming that the tank 11 initially contains 25 gallons of liquid oxygen, as indicated, the five reactors operating continuously should produce about a quarter of a pound of product in two hours, which is the limit of solubility of the bath. The degree of saturation of the solution is determined by withdrawing a sample through the coaxial conduit 11a, which carries a quarter-inch inner tube containing product in solution with liquid oxygen under control of the extended bonnet valve 15a, and an outer tube of liquid oxygen for cooling purposes. If it is determined that the solution has reached saturation, then the entire tank 11 is evacuated through the coaxial conduit 11b under control of the extended bonnet valve 15b. Conduit 11b carries a three-quarter inch inner tube of product in solution surrounded by liquid oxygen. The evacuation may take place under increased pressure, induced in the tank 11 by a charge of helium, in a manner to be explained hereinafter.

Returning now to the reactors 5, the electrodes 18 and 19, the latter of which is grounded, represent pairs of electrodes in each of the reaction bulbs which are respectively connected across a plurality of energizing circuits which are in parallel across a source of power 21, of 120 volt alternating current. Each of the circuits, which are five in the present embodiment corresponding in number to the reaction bulbs 5, includes a transformer 23, the primary of which is connected across source 21, and the secondary of which is connected between electrode 18 and grounded electrode 19. A variable resistor 22 for regulating the current into the primary is interposed thereacross in each of the circuits. Each of transformers 23 is designed to step-up voltages to a maximum of 5,000 volts in the secondary, and to draw currents up to a maximum of 120 milliamperes. An ammeter 24, having a range between zero and 100 milliamperes, is interposed in series in each secondary circuit, the current in each circuit being maintained at an optimum constant level of about 47 milliamperes to sustain a continuous glow-discharge in each of reaction bulbs 5 during the production of trioxygen difluoride. The energy dissipated in the discharge generally varies in each of reaction bulbs 5 between 75 and 85 watts and a voltage of between roughly 1600 and 1800 volts, depending on the degree of evacuation of the tubes, which generally varies between 12 and 20 millimeters of mercury. The high voltage electrostatic voltmeter 25 is supplied with a probe which can be inserted into the appropriate one of jacks 25a to measure the voltage across a specific pair of electrodes 18 and 19.

The system including reaction bulbs 5 is evacuated through an exhaust path which includes the one-half inch stainless steel conduit 113 connected between the manifold 8 and junction 118, valve 115, the conventional vacuum pump 112, junction 116, and the vent 52 which leads into a vat of lime or oyster shells which serve to absorb traces of fluorine or hydrogen fluoride which may be present in the exhausted gases. During this operation, valve 114 is closed. When the latter is open it provides an escape route for excess gas, such as oxygen or helium which may be used prior to operation of the system to purge the system of impurities, and also low concentrations of fluorine which may be used for the same purpose. Exhaust gas from such a purging operation by-passes the vacuum pump 112, valve 115 being closed, and passes through one-half inch stainless steel pipe 113 and valve 114 to junction 117, and out through vent 52 and the chamber of lime or oyster shells.

When operation of the system is commenced, the pressure in the system is first lowered to about one millimeter of mercury, at which level of evacuation the glow-discharge is initiated. The pressure is then gradually raised to a level of between 12 and 20 millimeters of mercury, at which level the operation of the system proceeds.

It will be apparent that throughout the system the piping, valves and glass, and metal components are of materials resistant to the corrosive effects of fluorine and hydrogen fluoride. For example, the conduit system comprises pipes of No. 316 stainless steel which also form the material for the metal enclosures immediately in contact with the fluids. The glass components are of standard laboratory glass, such as a borosilicate glass manufactured under the trademark "Pyrex," which is resistant to low temperatures, as well as the corrosive effects of the fluids.

Moreover, before commencing operation of the system, it is necessary to completely degrease all of the pipe lines, dry them out, and purge them of impurities. Dry nitrogen gas is provided from a conventional cylinder, or other source 68 for a preliminary purge of the system. It flows through a quarter-inch stainless steel pipe line under control of valve 69 to junction 71. From the latter, one branch, under control of valve 99, passes through quarter-inch conduit 100 and a gas-tight intake seal into the outer housing 4 enclosing the complex of reaction bulbs 5. Housing 4 has a nitrogen vent 101 on its other side for carrying off the excess nitrogen gas after a purge operation.

Another branch of quarter-inch pipe from junction 71 carries nitrogen gas, under control of valve 95, through the conduit 96 which leads to an intake pipe into insulated enclosure 3 surrounding receiving vessel 11, which is provided with a vent 97 for passing nitrogen to the atmosphere. A third nitrogen line from junction 71 passes through junction 46 (from the source of fluorine-oxygen mix, which is closed under control of valve 45) through quarter-inch conduit 47 and valve 72 to junctions 73 and 74 where the line again branches. One branch, under control of valve 77, leads through junction 66 and conduit 67 to the complex of reaction bulbs 5 for which it serves as a purge line to dry out these bulbs and remove impurities prior to operation. Another branch, under control of valve 75, goes to junction 76, where, assuming valve 62 is closed, it will serve the same purpose for the fluorine-oxygen supply lines, or, with valve 62 open, for the other part of the oxygen-fluorine circuit including storage tank 63. Valves 120 and 55 may be opened to serve as egress points for the nitrogen used to flush out the system, including hydrogen fluoride gas adsorbed in the sodium fluoride scrubber 54, which would ultimately be removed through vent 52 over lime or oyster shells to absorb traces of fluorine and hydrogen fluoride.

It will be understood that whereas it may be desirable to use a nitrogen purge in parts of the system as a preliminary measure for drying out the pipes and removing impurities, no trace of nitrogen should be left in parts of the system which come in contact with the fluorine-oxygen mix, as the presence of nitrogen would lead to the formation of oxides of nitrogen which would contaminate the trioxygen difluoride product and interfere with its production.

Accordingly, subsequent to the use of nitrogen, portions of the system in contact with the oxygen-fluorine mix may be purged with helium, or liquid oxygen and ultimately subjected to passivation using a portion of the oxygen-fluorine mix to flush impurities out of the apparatus before actual operation is commenced.

The helium line leading to junction 73, under control of valve 72, will be described subsequently.

Liquid oxygen, having a purity of 99.95 percent, to flush out portions of the system, to provide cryogenic baths and also to provide a solvent for the trioxygen difluoride product is derived from the storage tank 27 through a three-quarter inch pipe, under control of a valve 29, to junction 30 where the system splits into four branches. A three-quarter inch pipe 32a, under control of valve 31a, is connected to the receiving tank 11 to supply approximately 25 gallons of liquid oxygen bath, which acts as a solvent for the aggregate trioxygen difluoride product manufactured in the reaction bulbs 5.

A half-inch pipe 32b, under control of valve 31b, supplies liquid oxygen to the outer coaxial shells of the coaxial top pipes 11a and 11b, through the inner pipes of which batches of saturated solution (0.11 percent by weight) of trioxygen difluoride in liquid oxygen are drawn off, as previously described.

The third branch 32c, which is a half-inch pipe under control of valve 31c, passes through a valve 36, which is actuated under control of the solenoid 35, in response to the conventional liquid-level control circuit 34 which has probes at the bottom and at the top of the liquid bath in trapezoidal container 2, under control of valves 28a and 28b. This mechanism operates to keep the liquid oxygen bath in container 2 at a preselected level, so as to completely cover the reaction bulbs 5 and their appendages, and to maintain the entire assemblage at liquid oxygen temperatures constantly during the reaction and also, to maintain the ends of electrodes 18 and 19 immersed. Excess oxygen from enclosure 2 is drained off through valve 13 and conduit 14 to water trough 26.

The fourth branch 32d, which is a half-inch pipe under control of valve 31d, furnishes liquid oxygen to flush out the inclined stainless steel manifold tube 8, into which is fed trioxygen difluoride product from the bulbs 5, for the previously stated purpose of removing impurities prior to instituting the reaction.

The level of the bath in tank 11 is indicated on the liquid level indicator 98, which is connected through the three-eighths inch pipe 119a under control of valve 120a, to the top of bath 12; and, through the three-eighths inch pipe 119b under control of valve 120b, to the bottom of tank 11. Excess amounts of oxygen both may be drawn off through valve 17 leading into open water through 26.

A mixer 80, which is disposed to keep the bath 12 in constant circulation during the solution of trioxygen difluoride, is driven pneumatically by air under pressure from a source 82 through a one-half inch pipe 81, under control of valve 83. After actuating the pneumatic drive of mixer 80, the air passes out to the atmosphere.

The bath 12 in tank 11 is maintained during operation of the system at pressure slightly above atmospheric, say, between zero and five pounds per square inch gauge pressure. If, for any reason, it is desired to raise the pressure, say, for evacuation purposes, this is achieved by a charge of helium forced into tank 11 from the source 85, which is a conventional cylinder of helium gas under pressure. The line from the source 85, under control of the valve 86, passes through a quarter-inch pipe to junction 87. One branch leads through valve 92 and conduit 93 to the top of tank 11.

Line 93 is also connected to a safety vent (not shown) which goes to the atmosphere, in case the pressure in the helium line becomes too great.

The other helium line from junction 87 which is a purge line under control of valve 88, passes through the quarter-inch line 89, which passes through a conventional cold trap 90 to remove water and carbon dioxide, and under control of valve 91, to junctions 73 and 74. Thus, as previously pointed out, as a matter of preference in preparation of the system, helium, instead of nitrogen, can be used to pressurize or purge the system of impurities, through the quarter-inch purge line under control of valve 77, through junction 66 and conduit 67 to the reaction bulbs 5. Also, under control of valve 75, the helium can be forced through the junction 76, backwards or forwards, depending on whether valve 62 is open or closed, to purge out the supply circuit designed to conduct the fluorine-oxygen mix, prior to operation of the system.

A substantially stoichiometric mixture of oxygen and fluorine (about six parts of oxygen to four parts of fluorine) is supplied to the reaction bulbs 5 through the following circuit.

Source 39, which is a conventional cylinder of the oxygen-fluorine mixture, in the above proportions, in which the oxygen component has a purity of 99.95 percent, and the fluorine component has a purity of at least about 99 percent, is initially under a pressure of 500 pounds per square inch absolute at room temperature.

The gas cylinder 39 is connected under control of the stainless steel regulator 42 and a pair of double valves 43a and 43b, to junction 33. The regulator 42 and each of valves 43a and 43b are especially constructed of materials resistant to the corrosive activity of fluorine or hydrogen fluoride. Valves 43 and 44, together with regulator 42 may be, for example, of a type available commercially.

Interposed at the junction 38 is a quarter-inch line leading through a pressure gauge, having a scale from zero to 500 pounds per square inch and also of a type resistant to the corrosive action of fluorine. This line, which is connected through the needle-valve 49 of a type also available commercially, is a dump line, leading out through junction 51 and vent 52 over lime or oyster shells for absorbing any fluorine gas left in the line when the gas supply cylinder 39 is removed and replaced.

The supply cylinder 39 of the gaseous mixture, together with valves 42, 43a, 43b, 45 to the nitrogen purge line and 49 to the dump line, is enclosed in a double walled safety enclosure 40–41 formed of steel resistant to fluorine fumes.

From junction 33, the line 44 for transmitting the oxygen-fluorine mixture passes through scrubber 53 which is a reaction chamber charged with sodium fluoride powder, the latter serving to absorb any traces of hydrogen fluoride from the gaseous mixture. The heating coil 54, controlled by the variable resistor 54b, serves to heat up the scrubber 53 during the purge of the system with nitrogen, removing the adsorbed hydrogen fluoride therefrom and expelling it from the system through valve 55 and vent 52 over lime.

The gaseous mixture purged of hydrogen fluoride, passes from scrubber 53 to junction 28. Assuming valve 55 to the dump line is closed, the mixture of gases passes through valve 57 to junction 58. The rate of flow through this section of pipe can be measured by closing valve 57a, opening valves 60a and 60b, and thereby diverting the stream of gas through flowmeter 59. This is any conventional type, formed of materials resistant to the corrosive action of fluorine.

From junction 58 the stream passes through junction 66 with lines from valves 120 and 119, which are normally closed. Valve 119 serves to derive a sample of the gas stream to test its purity. Valve 120, when opened, leads to the dump line, when it is desired to expel gas from the system.

The line then passes junction 76, adjacent normally closed valve 75 which leads to the nitrogen-helium purge lines, and through normally open valve 62 to the reservoir tank 63. This has a twelve inch outer diameter and thirty-six inch length, with a cubic capacity of approximately 2.25 cubic feet. It is formed of a stainless steel which resists the corrosive activity of fluorine gas.

The outlet from reservoir tank 63 passes to junction 75, adjacent lines to normally closed valves 122 and 123; the former leading to the dump line for the expulsion of gas and the latter available for sampling the purity of the supply gas mixture.

From junction 78 the line passes, under control of valve 65, through junction 66 (leading to the normally closed valve 77 to the purge lines), through the supply conduit 67 and vacuum tight seals in housings 4 and 2 to the coiled glass ingress tubes 6 leading into each of the glass reaction bulbs 5.

Oxygen gas, vaporized, from the refrigerant bath in container 2 surrounding reactors 5, may be expelled through the line 102 which leads through the valve 103, normally closed, junction 109, valve 104, junction 105, and valve 106, where the oxygen is periodically vented. However, if the pressure becomes too great, the oxygen is vented through valve 111, normally open, and line 110 by means of the safety vent 121, which is under control of pressure indicator 123. The particular valve arrangement shown is, of course, merely illustrative of one possible valve arrangement. The water from the water trough 26, which serves to carry liquid oxygen drained off through valves 13 or 17, is drained through line 125, under control of valve 124.

Figure 4:
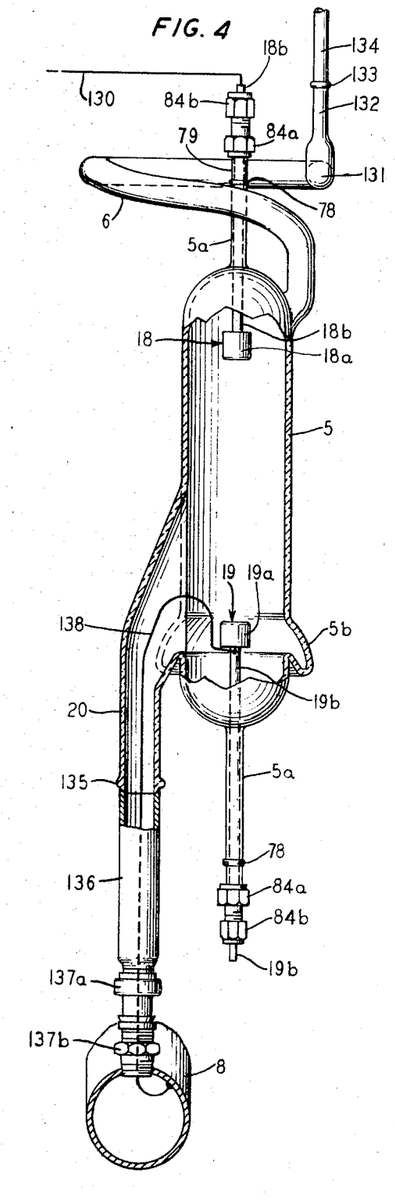
FIGURE 4 is an enlarged showing of a single reaction bulb with modifications in accordance with the present invention, including a collecting lip molded into the vertical sidewall and electrodes which are cooled by extension of their ends in proximity to and in contact with the cryogenic bath.

Let us refer to FIGURE 4 of the drawings which is a detailed, enlarged showing of a single unit of the reactors 5, indicated in the array shown in the over-all schematic of FIGURES 1 and 2.

In the present illustrative embodiment, reactor tube 5 comprises tubing of standard laboratory glass, such as a borosilicate glass sold under the trademark "Pyrex," having a wall thickness of, say, three-thirty-seconds of an inch, an inner diameter of two inches, and, say, ten inches long between hemispherical ends.

Axially disposed in each end of tube 5 is an electrode, the high-potential electrode 18 being mounted in the upper portion of the tube, and the grounded electrode 19 being mounted in the lower portion thereof, so that their ends are spaced apart, say, five inches, along the axis of the tube, the lower rod 19b extending three inches up from the bottom of the tube and the upper rod 18b extending two inches down from the top of the tube. Each of these electrodes comprises a solid copper rod 18b, 19b, respectively, three-sixteenths inch in cross-section, the upper rod 18b having a total length of six and one-half inches, and the lower rod 19b having a total length of five and one-half inches. Welded in axial symmetry on the inner ends of each of electrodes 18 and 19 are cylindrical copper cups 18a, 19a, respectively, each of which measures about one-half inch in outer diameter and is about one-thirty-second of an inch thick, and one-half inch deep. The outer ends of each of electrode rods 18b and 19b are extended through the top and bottom, respectively, of tube 5 for one and one-half inches inside of "Pyrex" tubes 5a, five-eighths of an inch in outer diameter and one-sixteenth of an inch thick, which are integrally formed with the ends of tube 5. The "Pyrex" tubes 5a terminate at their outer ends in glass-to-metal seals 78 with one-quarter-inch-outer-diameter tubes of "Kovar," one-sixteenth of an inch thick alloy consisting of 29 percent nickel, 17 percent cobalt, 0.2 percent manganese, and the balance iron. The actual seal is made to the metal by means of a uranium glass, known in the trade as "transition glass."

The "Kovar" tubes 79 which respectively extend two inches out from the glass-to-metal seals 78, terminate at each of their outer ends in a three-sixteenths of an inch inner diameter female fitting 84a which fits over a tapered ferule (not shown) of, for example, a polymerized chlorofluoroethylene manufactured under the trademark "Kel-F," and into which is fitted a male fitting 84b, which tapers from one-quarter of an inch to three-sixteenths of an inch inner diameter to fit tightly over the ends of rods 18b and 19b, each of which protrudes about one-half inch into the cryogenic bath in the inner enclosure 2 (see FIGURES 1 and 2). Stainless steel fittings 84a and 84b may be, for example, of the type manufactured under the trademark "Swagelok."

The upper electrode terminal 18a in each of reaction bulbs 5 is connected to a lead 130 which is ultimately connected through the circuit previously described to power source 21.

Near the top of each reaction tube 5, and integral therewith, is a glass gas intake tube 6 of one-half inch cross-section, forming a single spiral turn surrounding upper tube 5b, which encloses upper electrode rod 18b, and is connected through junction 131 about one and one-half inches above the top of tube 5, with a vertically disposed glass tube 132. The latter has a five-eighths of an inch outer diameter, a wall thickness of about one-sixteenth of an inch, and is parallel to and spaced about one and one-quarter inches from the center of electrode rod 18b. Tube 132 extends upward from junction 131 for about one inch, where it forms a glass-to-metal seal 133, similar to the previously described seals 78, with a one-quarter of an inch outer diameter "Kovar" tube 134, which connects into charge line 67, ultimately leading to the source of oxygen-fluorine mix. An important feature of this arrangement is that the path length along spiral tube 6 and connecting vertical tube 131 from the inlet at the top of tube 5 to the seal 133, is at least 11 inches in the present invention, to prevent any possibility of a spark-gap forming between electrode 18 and "Kovar" tube 134.

Extending out from a lateral wall in tube 5 and projecting in a general downward direction is an arm 20, the upper surface of which projects out at about a 30 degree angle with the side-wall just below the center of tube 5, and extends to a plane about three inches below, where it bends to assume a vertical position. The arm 20 is about three-quarters of an inch in cross-section and is joined at its lower periphery to the arm-hole of tube 5 about one-eighth of an inch below the end of cap 19a of electrode 19, in a position to receive and drain off liquid collected in the lip 5b, to be described presently. The straight vertical portion of tube 20, which is parallel to electrode rod 18b, extends downward a little over two inches, to just below the bottom of tube 5, where it forms a glass-to-metal seal 135, similar to seals 78, with a length of three-quarters of an inch outer diameter "Kovar" tubing 136.

Tube 136 extends downward about 2 inches to a metal connection 137a–137b, which may also be a "Swagelok" connection, similar to the connections 84a–84b previously described, except for its larger diameter accommodating the three-quarters of an inch "Kovar" tube 136 and its termination, which is adapted to screw into the upper surface of the two inch outer diameter stainless steel manifold pipe 8. The latter, which is the present example, has a wall thickness of 0.145 inch, has an over-all length of, say, 24 inches and is designed to accommodate the egress pipes from each of the reaction bulbs 5 at equally spaced intervals therealong, in the manner just described. As previously pointed out, the manifold tube 8 is inclined relative to the horizontal plane, being disposed at about a 30 degree angle therewith, so that the combined products of each of tubes 5, during operation, are collected and drained into the connecting conduit 9 under control of the valve 10. Although pipe 8 comprises stainless steel in the present illustrative embodiment, it will be apparent that it could be formed of any metal having similar thermal, electrical and structural characteristics.

A ground lead 138, which is connected to the electrode 19, passes out through the arm 20 to the metal pipe 8 where it is soldered or otherwise makes electrical contact. The manifold pipe 8 is then connected to ground potential through a suitable external connection. Grounding could also be effected, for example, through rod 196.

As pointed out with reference to the over-all system of FIGURES 1 and 2 hereinbefore, the manifold pipe 8 is connected through the conduit 113 to vacuum pump 112, for evacuating the reaction system. Moreover, at its upper end it is also connected to the liquid oxygen source 27, for flushing out the system when necessary, using the alternate route for evacuating the liquid which by-passes vacuum pump 112 through valve 114 and junction 117 to vent 52. Among the salient features of the present invention is the lip 5b which is formed in the vertical wall of the tube 5, creating an annular channel projecting out from the wall about one inch below the end of electrode cap 19a, the position of lip 5b coinciding with the lower junction of the arm 20 to tube 5. The lip forms a channel about one-quarter of an inch deep, and one-eighth of an inch in cross-section, the junction with arm 20 being at substantially the lowest point in the channel so that the collected liquid runs off into the arm 20. The channel formed by lip 5b serves several functions. It collects the newly formed trioxygen difluoride liquid which runs down the sidewall of the tube 5 in a place removed from the heat of the glow-discharge which would cause immediate decomposition of the liquid. Further, it tends to hold back any dioxygen difluoride impurity which may be formed during the glow-discharge induced reaction because the oxygen difluoride is a solid.

It will be noted that the relatively long, narrow tubes 5a extending from the top and bottom of tube 5, enclosing rods 18a and 18b in close proximity to the liquid oxygen bath, and also the end projections of these electrode rods, about one-half inch in actual contact with the bath, also serve the purpose of conducting away the heat generated during the glow-discharge, which tends to decompose the newly formed product whenever the temperature exceeds about 120° K.

Figure 5A:
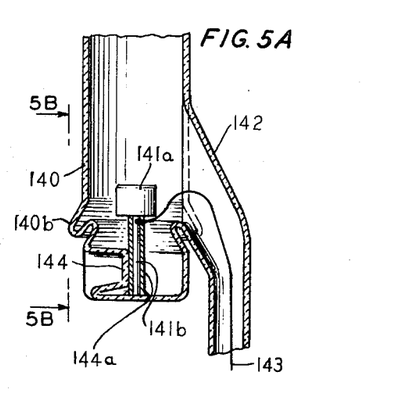
FIGURES 5A and 5B show in cross-section and front elevation, respectively, the lower portion of an alternative form of reaction bulb in accordance with the present invention, in which cooling of the electrode is accomplished by a dimple for bringing the cryogenic liquid adjacent to the stem of the electrode.
Figure 5B:
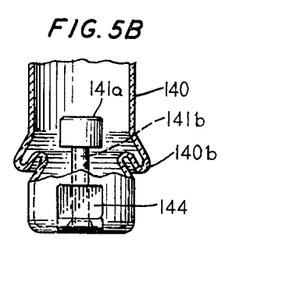

A similar purpose is achieved by a slight modification of the lower portion of reaction tube 5 in the manner indicated in FIGURES 5a and 5b of the drawings. In these figures tube 140 corresponds to tube 5, the composite electrode 141a–141b corresponds, with modifications, to electrode 19a–19b; and the lip 140b corresponds to lip 5b.

Electrode 141, in addition to being formed with a copper cap 141a and an axial copper rod 141b, one-eighth of an inch in diameter, may also have welded thereon an additional copper tube having an inner diameter just large enough to accommodate the central copper core, and an outer diameter of about three-sixteenths of an inch. Still another tube in the form of a copper sleeve, having an inner diameter just over three-sixteenths of an inch and an outer diameter about five-sixteenths of an inch, may be slideably disposed on the electrode rod 141b. Such a combination tends to further dissipate the heat from the central portion of reaction tube 140.

In this modification, the bottom of reaction tube 140 below the end of the composite electrode rod 141b is substantially shortened, being about one and one-half inches in depth below the bottom of the electrode cap 141a, the electrode rod 141b and sleeves being correspondingly shortened to fit inside of tube 140. A dimple 144 is formed in the lower sidewall of tube 140, below the lip 140b. The dimple 144 is about one-half inch wide, one inch long, and one inch deep, and serves to bring the cryogenic fluid in close proximity to the composite metal rod 141b of the electrode 141 to disspite the heat therefrom. The outer sleeve of electrode rod 141b is inserted in a glass tube 144a, which in turn is sealed to the inner indented portion of the dimple 144, as shown.

The electrical lead 143 to electrode 141 is led off through the arm 142 to a common ground.

Figure 6:
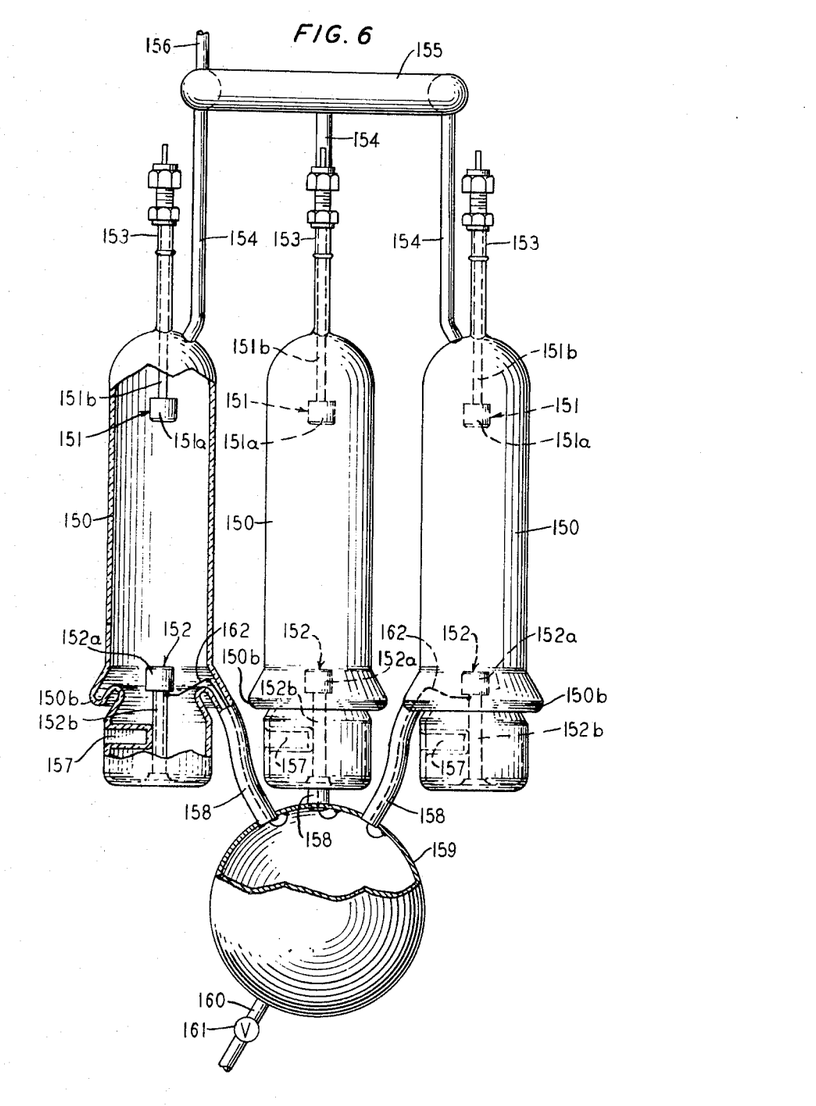
FIGURE 6 shows an alternative embodiment of the invention in which the reaction bulbs are disposed in a circular array.

Let us refer, now, to FIGURE 6 of the drawings, which shows another embodiment of the present invention. The present example shows three reactors 150 comprising two inch outer diameter glass tubes, having a general similarity to the reactor 5 (described in detail with reference to FIGURE 4) which are disposed in a symmetrical circular array although any convenient number can be used. We have commony used light reactors in the array.

It is contemplated that the circular array indicated in FIGURE 6, with slight adjustment, can replace the straight-line array of reaction tubes 5, disposed in the inner housing 2 in the over-all system of FIGURES 1 and 2.

In FIGURE 6 reaction bulbs 150 are arranged symmetrically around a common vertical axis, so that the outer vertical surfaces are tangential to a circle approximately nine inches in diameter. As in the reactors 5, the upper electrode rods 151b corresponding to rods 18b, are brought in through a three-eighths of an inch outer diameter tube at the top, the latter terminating at its upper end in a glass-to-metal seal with a "Kovar" tube, as previously described, which leads into a "Swagelok" fitting. The upper ends of anode rods 151b protrude into the cryogenic bath in the manner described with reference to FIGURE 4, and serve as binding posts for leads brought in from the source of power 21. The gas ingress arms 154, which correspond to the spiral arms 6 in FIGURE 4, are quarter-inch outer diameter glass tubes, leading into a common torroidal glass tube 155 of three-quarters of an inch cross-section, the outer periphery of which forms a circle five and one-half inches in a horizontal plane. The quarter-inch glass tube 156 leads off for connection to the charge line 67 for oxygen-fluorine mix, in a manner previously described with reference to FIGURE 4. As in the embodiment of FIGURE 4, it is important that the path length between electrode rods 151b in adjacent tubes, as measured through the arms 154 and the torroidal reservoir 155, should be more than twice the separation between electrodes 151 and 152 in each of tubes 150, to prevent sparking between electrodes in different tubes.

In the present illustrative embodiment, the tubes 150 have been shown to be modified in accordance with FIGURES 5A and 5B to include the flat lower portion having a dimple 157, which is indented to support the vertical glass tube which in turn receives the copper rod 152b of cathode 152, in the manner previously described, so that the cryogenic bath is brought in adjacent to the cathode rod 152b to conduct the heat away.

As in the previously described embodiment, a lip 150b is molded into the vertical sidewall of the reaction bulb 150, projecting outward about one-quarter of an inch on each side and about one-quarter of an inch deep, and one eighth of an inch in cross-section, providing an annular channel for receiving the newly formed trioxygen difluoride liquid as it runs down the vertical sidewall of tube 150.

A glass arm 158 integral with tube 150 and comprising a tube slightly more than three-quarters of an inch in cross-section, is attached in the manner of arm 20 to tube 5, FIGURE 4, the bottom of the armhole coinciding with the inner edge of lip 150b. The arms 158 from each of the bulbs 150 of the circular array of FIGURE 6 feed into a large spherical vessel 159 for manifolding the product from each of the eight reactors.

Whereas in certain modifications of the invention the receiving vessel 159 may be formed of glass in a system integral with the reactor tubes 150 and equipped with means for withdrawing the liquid product at intervals under pressure, the present arrangement contemplates that the vessel 159 will be of stainless steel, say, four inches in diameter, and adapted to replace the cylindrical manifold 8 of FIGURES 1 and 2. Moreover, in accordance with such arrangement, it is contemplated that the spherical stainless steel manifold 159 will have in its lower portion an outlet tube 160 which leads off through a valve 161, corresponding to the outlet from the cylindrical manifold 8 under control of valve 10, shown in the over-all system of FIGURES 1 and 2. Thus, the product, after being collected in the manifold 159, upon opening of valve 161 would drain into the connecting tube 9 and ultimately go into solution in the bath 12 in the receiving tank 11, in the manner previously described.

It will be apparent that glass-to-metal seals and "Swagelok" connections would be provided between the arms 158 and the stainless steel spherical manifold 159 in the manner described in detail with reference to the cylindrical manifold 8 of FIGURES 1 and 2; and, also, that the spherical manifold 159 would be connected to lines leading to the vacuum pump 112 and the liquid oxygen purge line, as indicated in the system of FIGURES 1 and 2.

The connection 162 to the electrode 152 passes through the arm 158 and is grounded on the metal spherical manifold 159, which is connected to an external ground.

In case of the all-glass model previously discussed, the cathode leads are connected together to a mutual point, which is externally grounded.

Whereas the systems having metal manifolds and metal lead-in arms are structurally self-supporting, it is necessary to mount the all-glass structure in one or more disks of a heat insulating material, such as a mixture of cement and asbestos sold under the trademark "Transite," supported in a suitable frame.

As pointed out previously, before operation of any of the systems described, the component parts must be thoroughly degreased. This may be achieved by cleaning them in acetone, trichloroethylene and water, or any similar grease solvents. Moreover, after the system has been set up, prior to operation, it should be flushed out with an inert gas to dry it and to remove possible contaminants, and ultimately subjected to passivation by flushing it out with low concentrations of fluorine or with a small portion of the oxygen-fluorine mix.

In commencing operation of any of the systems described, the system is first pumped out to an evacuation of about one millimeter of mercury, at which point the glow-discharge is initiated. It has been found that the opitmum operating conditions are at 47 amperes of current, at a power between 75 and 85 watts. To achieve optimum operation, the current is set at the desired value, and the pressure of the fluorine and oxygen mix is gradually increased in the reaction bulb until the voltage across the tube reaches the point at which the energy of the discharge is within the proper power range. Whereas the actual pressure within the reaction tube is generally within the range 12–20 millimeters of mercury during operation, this may vary. Such pressure variations have been found to cause no trouble as long as the current and power remain within the proper range of values.

The following table shows the results of some experiments using a reactor of the type indicated in FIGURE 4 of the drawings:

| Operating time | Current (ma.) | Power (watts) | Amount of $O_3F_2$ produced |
| --- | --- | --- | --- |
| 1 hour | 47 | 75 | 5 ml. (8.75 gms.).[1] |
| 4 hours | 47 | 78 | 19 ml. (33.2 gms.).[1] |

[1] This assumes a density for $O_3F_2$ as 1.75 grams per milliliter.

It will be seen from the foregoing table that the four-hour run produced very close to four times the one-hour run, the difference being due to small amounts of product retained on the glass walls of the reactor.

Figure 7:
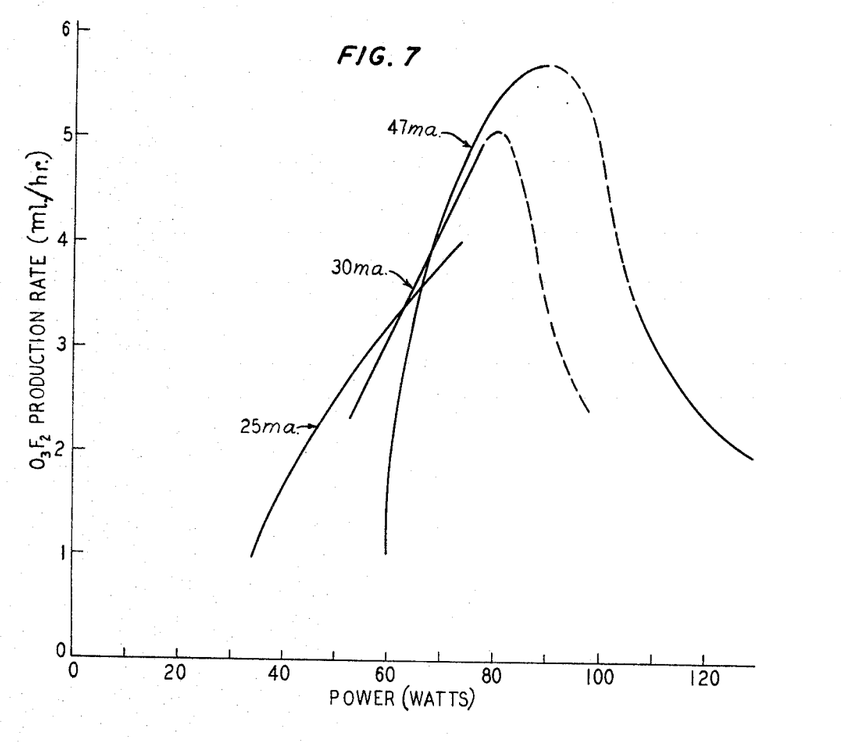
FIGURE 7 includes three curves showing production of trioxygen difluoride as a function of power at different values of constant current, using apparatus of the present invention.

FIGURE 7 of the drawings is a curve which shows the rate of trioxygen difluoride production as a function of power at constant current, using a reactor of the type shown in FIGURE 4. Trioxygen difluoride production rate in milliliters per hour is plotted against power in watts, for three different values of constant current, namely, 25 milliamperes, 30 milliamperes, and 47 milliamperes.

Figure 8:
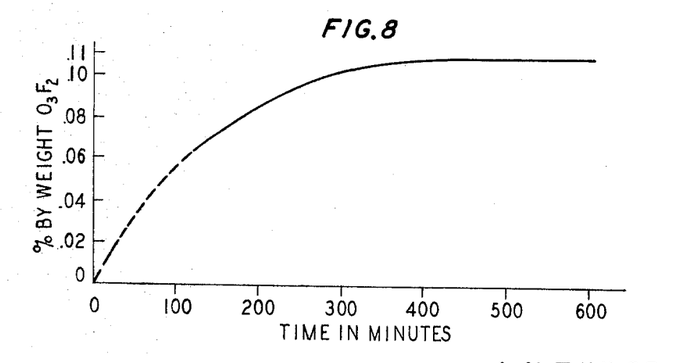
FIGURE 8 is a curve showing the rate of solution of trioxygen difluoride in liquid oxygen.

FIGURE 8 of the drawings shows the result of an experiment in which the concentration of dissolved trioxygen difluoride was measured as a function of time after pure trioxygen difluoride was poured into liquid oxygen. The initial volumes of trioxygen difluoride and liquid oxygen were seven milliliters (12.2 grams) and three liters, respectively. The oxygen was stirred constantly during this experiment. In the curve, percent by weight of trioxygen difluoride, in solution with liquid oxygen, is plotted against time in minutes. It is seen that in this experiment the rate of solution levels off after about 425 minutes at a concentration of 0.11 percent by weight of trioxygen difluoride, which may suggest the length of operation of the apparatus before evacuation of one batch of trioxygen difluoride in solution with liquid oxygen.

It is understood that the particular dimensions and other details of construction contained in this specification are included for illustrative purposes in disclosing the invention and that the scope of applicant's invention should only be limited by the following claims.

We claim:

1. In a fluid-tight apparatus for producing liquid trioxygen difluoride, wherein at least a portion of said apparatus is maintained in a cryogenic bath, which comprises in combination a reaction vessel, means for evacuating said reaction vessel, a pair of electrodes mounted in opposite ends of said reaction vessel, a source of power connected to produce between said electrodes a continuous glow-discharge, means for supplying a mixture of oxygen and fluorine gases to said reaction vessel, a reservoir for collecting trioxygen difluoride produced in said reaction vessel, and means for connecting said reaction vessel to said reservoir, the improvement comprising a downwardly protruding lip moulded into the vertical wall of said reaction vessel, said lip forming on the interior of said reaction vessel an annular channel adjacent said connecting means for collecting said liquid trioxygen difluoride in an area substantially removed from the heat of said glow-discharge.

2. A fluid-tight apparatus for producing liquid trioxygen difluoride wherein at least a portion of said apparatus is maintained in a cryogenic bath, which comprises in combination a reaction vessel, means for evacuating said reaction vessel, a pair of electrodes mounted in opposite ends of said reaction vessel, a source of power connected to energize said electrodes to produce between them a continuous glow-discharge, means for supplying a mixture of oxygen and fluorine gases to said reaction vessel, and means comprising a downwardly inclined tube forming a connection with the lower portion of said reaction vessel for collecting trioxygen difluoride from said reaction vessel, wherein a downwardly protruding lip is moulded into a vertical wall on said reaction vessel, said lip forming on the interior of said reaction vessel an annular channel adjacent the connection of said downwardly-inclined tube to said reaction vessel for collecting said liquid trioxygen difluoride in an area substantially removed from the heat of said glow-discharge.

3. A fluid-tight apparatus for producing liquid trioxygen difluoride wherein at least a portion of said apparatus is maintained in a cryogenic bath, which comprises in combination a reaction vessel, means for evacuating said reaction vessel, a pair of electrodes mounted at opposite ends of said reaction vessel, a source of power connected to energize said electrodes to produce between them a continuous glow-discharge, means for supplying a mixture of oxygen and fluorine gases, to said reaction vessel, means comprising a downwardly-inclined tube forming a connection with the lower portion of said reaction vessel for collecting trioxygen difluoride from said reaction vessel, and means for supporting at least a portion of said reaction vessel in a cryogenic bath wherein the outer ends of said electrodes are extended to close proximity with said cryogenic bath for conducting heat away from said electrodes.

4. A fluid-tight apparatus for producing liquid trioxygen difluoride which comprises in combination a plurality of reaction vessels, means for evacuating said reaction vessels, a pair of electrodes respectively disposed in opposite ends of each of said reaction vessels, a source of power connected to energize the electrodes in each of said reaction vessels to produce between each pair of said electrodes a continuous glow-discharge, means for supplying a mixture of oxygen and fluorine gases, a system of conduits connected to said supply means and to said reaction vessels for supplying a portion of said mixture to each of said reaction vessels, a manifold, each of said reaction vessels forming near its lower end a connection with said manifold, conduit means connected to said manifold whereby liquid trioxygen difluoride produced in each of said reaction vessels is collected in said manifold, means for evacuating said liquid from said manifold, and means for maintaining at least a portion of said apparatus including said reaction vessels in a cryogenic bath.

5. The combination in accordance with claim 4 wherein said manifold comprises a metal tube forming a connection with each of said reaction vessels at spaced intervals along its length, the longitudinal axis of said manifold tube being substantially inclined relative to the horizontal plane.

6. The combination in accordance with claim 4 wherein said reaction vessels are disposed in substantially circular array.

7. The combination in accordance with claim 4 wherein said means for evacuating liquid from said manifold includes a storage vessel containing a bath comprising a substantial proportion of liquid oxygen for dissolving and storing said liquid trioxygen difluoride product.

8. A fluid-tight apparatus for producing liquid trioxygen difluoride which comprises in combination a reaction vessel comprising an elongated glass bulb, means for evacuating said bulb, a pair of electrodes mounted in opposite ends of said bulb, a source of power connected to energize said electrodes to produce between them a continuous glow-discharge, means for supplying a substantially stoichiometric mixture of oxygen and fluorine gases for producing trioxygen difluoride, a first conduit for connecting said supply means to said bulb, a second conduit comprising a downwardly inclined tube forming a connection with the lower portion of said bulb for collecting trioxygen difluoride liquid produced in said reaction vessel, a storage vessel disposed in relation to said downwardly inclined tube for receiving and storing said liquid, wherein at least a portion of said apparatus including said reaction vessel is immersed in a cryogenic liquid bath, and wherein a downwardly protruding lip is moulded into the side-wall on the lower portion of said bulb, said lip forming in the interior of said bulb an annular channel adjacent the connection of said downwardly inclined tube to said bulb for collecting said liquid trioxygen difluoride in an area substantially removed from the heat of said glow-discharge.

9. A fluid-tight apparatus for producing liquid trioxygen difluoride which comprises in combination a reaction vessel comprising an elongated glass bulb, means for evacuating said bulb, a pair of electrodes mounted at opposite ends of said bulb, a source of power connected to energize said electrodes to produce between them a continuous glow-discharge, means for supplying a substantially stoichiometric mixture of oxygen and fluorine for producing trioxygen difluoride, a first conduit for connecting said supply means to said bulb, a second conduit comprising a downwardly inclined tube forming a connection with the lower portion of said bulb for collecting trioxygen difluoride produced in said reaction vessel, and a storage vessel disposed in relation to said tube to receive and store said liquid, wherein at least a portion of said apparatus is maintained in a cryogenic liquid bath, and wherein the outer ends of said electrodes are extended in close proximity to said cryogenic bath for conducting the heat of said glow-discharge away from said electrodes.

10. A fluid-tight apparatus for producing liquid trioxygen difluoride which comprises in combination a plurality of elongated glass bulbs, means for evacuating said bulbs, a pair of electrodes respectively disposed in opposite ends of each of said bulbs, a source of power connected to energize the electrodes in each of said bulbs to produce between each of said pairs a continuing glow-discharge, means for supplying a mixture of oxygen and fluorine gasses in substantially stoichiometric proportions for producing trioxygen difluoride, a system of conduits connected to said supply means and to said bulbs for supplying said mixture to said bulbs, a downwardly-inclined manifold tube disposed below the lower ends of said bulbs, a lateral connection between each of said bulbs and a different position on said manifold tube, a storage vessel disposed in relation to said manifold tube to receive and store the aggregate of liquid produced in said bulbs, and means for maintaining at least a portion of said apparatus including said bulbs and said storage vessel in a cryogenic bath.

11. An apparatus in accordance with claim 10 wherein said storage vessel includes a bath comprising liquid oxygen for dissolving and storing said trioxygen difluoride in solution therewith.

12. A fluid-tight apparatus for producing liquid trioxygen difluoride which comprises in combination a plurality of reaction vessels comprising elongated glass bulbs each disposed with its long axis in a substantially vertical position, means for evacuating said bulbs, a pair of electrodes respectively disposed in opposite ends of each of said bulbs, a source of power connected to energize each of said pairs of electrodes to produce between each said pair a continuous glow-discharge, said elongated bulbs disposed in symmetrical circular array so that each of said long axes is substantially parallel to and equidistant from a common axis, means for supplying a substantially stoichiometric mixture of oxygen and fluorine gases for producing trioxygen difluoride, a system of conduits comprising a common conduit and branch conduits connected between each of said bulbs and said supply means for transmitting a portion of said mixture to each of said bulbs, a common manifold disposed in an area below the lower ends of said bulbs which is symmetrically located relative to said collective bulbs, separate conduits connected in substantial symmetry between the lower end of each of said bulbs and said manifold for transmitting the liquid trioxygen difluoride produced in each of said bulbs to a single reservoir in said manifold, and means for maintaining at least a portion of said apparatus including said bulbs and said manifold in a cryogenic bath.

13. A fluid-tight apparatus for producing liquid trioxygen difluoride which comprises in combination an elongated glass reactor disposed in a cryogenic bath, means for evacuating said reactor, a pair of electrodes one of which is substantially grounded mounted at opposite ends of said reactor, a source of power connected to energize said electrodes to produce between them a continuous glow-discharge, means for supplying a mixture of oxygen and fluorine substantially in the respective proportions three-to-two, conduit means for connecting said reactor to said supply means, a lip formed in the lower vertical wall of said reactor forming an annular channel slightly below the inner end of said grounded electrode, a second conduit leading off laterally from the lower vertical wall of said reactor at a position substantially coinciding with a low point in said channel, a storage tank, means comprising said second conduit for connecting said reactor to said storage tank, whereby trioxygen difluoride liquid produced in said reactor is ultimately evacuated into said storage tank.

14. The combination in accordance with claim 13 wherein each of the electrodes of said pair has a stem of high thermal conductivity connected thereto, means comprising glass enclosures appended to each of the ends of the ends of said reactor and terminating a glass-to-metal seal wherein said stem of high thermal conductivity of each said electrode is extended through said respective glass enclosure and said glass-to-metal seal to make heat-dissipating contact with said cryogenic bath.

15. A fluid-tight system for producing liquid trioxygen difluoride which comprises in combination a plurality of substantially vertically-disposed glass reactors enclosed in a cryogenic bath, means for evacuating said reactors, a pair of electrodes mounted in opposite ends of said reactors, one of the electrodes of each said pair being grounded, a source of power connected to energize said electrodes to produce between each of said pairs a continuous glow-discharge, means for supplying a mixture of oxygen and fluorine substantially in the respective proportions three-to-two, a first conduit for connecting each of said reactors to said supply means, a lip formed in the lower vertical wall of each of said reactors forming therein an annular channel slightly below the inner end of said grounded electrode, a second conduit leading off from the lower vertical wall of each of said glass reactors at a position substantially coinciding with a low-point in said channel, a manifold disposed below the lower ends of said reactors, each of said second conduits connected in spaced relation to said manifold, a storage tank containing a bath comprising a substantial proportion of liquid oxygen disposed below the lowest point in said manifold, and means comprising a third conduit under control of valve means connected between said lowest point and said storage tank for draining off the aggregate liquid trioxygen difluoride produced in said reactors to be dissolved and stored in said bath.

16. A system in accordance with claim 15 wherein said storage tank includes means for constantly stirring said bath, and valve means for drawing off batches of said bath at selected intervals.

17. The combination in accordance with claim 15 wherein the electrodes of each of said pairs have stems comprising a metal of high thermal conductivity, means comprising glass enclosures appended to each of the ends of said reactors and terminating in a glass-to-metal seal, wherein said stems of high thermal conductivity in each of said reactors are extended through said glass enclosures and said glass-to-metal seals to make heat-dissipating contact with said cryogenic bath.

18. The combination in accordance with claim 15 wherein said manifold comprises a metal tube inclined relative to the horizontal plane, and each of said conduit means is connected to said manifold through a glass-to-metal seal.

19. The combination in accordance with claim 15 wherein said reactors are disposed in substantially a circular array with reference to a horizontal plane, and wherein each of said conduit means is connected in substantial symmetry to a manifold having a circular cross-section in a horizontal plane.

20. A fluid-tight apparatus for producing liquid trioxygen difluoride which comprises in combination a reaction vessel, means for disposing said reaction vessel in a cryogenic bath, means for evacuating said reaction vessel, a pair of electrodes mounted at opposite ends of said reaction vessel, a source of power connected to energize said electrodes to produce between them a continuous glow-discharge, means for supplying a mixture of oxygen and fluorine connected to said reaction vessel, and means for evacuating the liquid trioxygen difluoride from said reatcion vessel, wherein the outer end of at least one of said electrodes is extended to close proximity with said cryogenic bath for conducting heat away from said electrode.

21. An apparatus in accordance with claim 20 wherein at least one of the electrodes of said pair has a stem of high thermal conductivity connected thereto, means comprising an enclosure appended to the end of said reactor enclosing said electrode and terminating in a seal between said enclosure and said stem wherein said stem of high thermal conductivity is extended through said enclosure and said seal to make heat-dissipating contact with said cryogenic bath.

22. An apparatus in accordance with claim 20 wherein the outer end of at least one of said electrodes comprises a stem of high thermal conductivity which is extended to close proximity with said cryogenic bath by means of a dimple formed in the shell of said reaction vessel, whereby said cryogenic bath is brought adjacent said stem for dissipating the heat in said stem.

23. An apparatus in accordance with claim 21 wherein the portion of said electrode stem in heat-dissipating contact with said cryogenic bath is a fin formed of material of high thermal conductivity.

References Cited

UNITED STATES PATENTS

| | | | |
|---|---|---|---|
| 2,876,188 | 3/1959 | Thorp et al. | 204—176 |
| 3,140,990 | 7/1964 | Edwards et al. | 204—176 |
| 3,205,162 | 9/1965 | MacLean | 204—176 |
| 3,296,110 | 1/1967 | Ruehrwein | 204—169 |

ROBERT K. MIHALEK, *Primary Examiner.*

U.S. Cl. X.R.

204—164, 322

UNITED STATES PATENT OFFICE
CERTIFICATE OF CORRECTION

Patent No. 3,437,582           Dated April 8, 1969

Inventor(s) Russell A. Hemstreet and Alfred H. Taylor

It is certified that error appears in the above-identified patent and that said Letters Patent are hereby corrected as shown below:

Column 6, line 64, "contro 1" should read -- control --.
Column 8, line 60, -- an -- should appear after "thick".
Column 9, line 53, "is" should be -- in --.
Column 10, line 9, "one inch" should read -- one-quarter of an inch, which bottoms on a plane about one inch --.
Column 10, line 61, "disspite" should read -- dissipate --.
Column 16, line 65, "reatcion" should read -- reaction --.

SIGNED AND
SEALED
MAR 24 1970

(SEAL)
Attest:

Edward M. Fletcher, Jr.
Attesting Officer

WILLIAM E. SCHUYLER, JR.
Commissioner of Patents